M. T. BOULT.
Apparatus for Turning Ovals.
No. 135,515.                                      Patented Feb. 4, 1873.
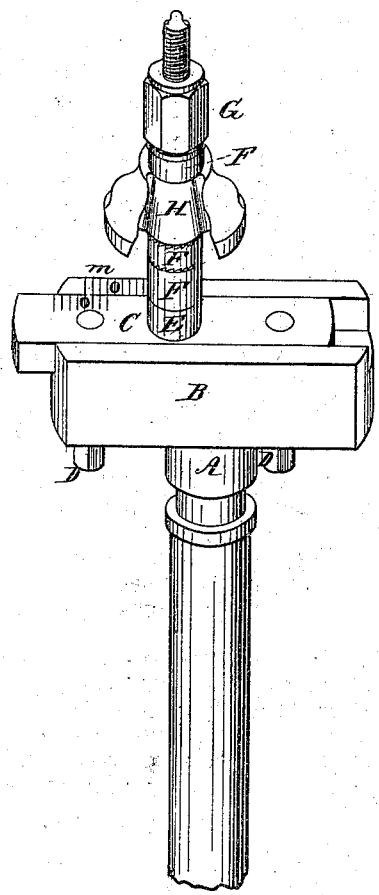
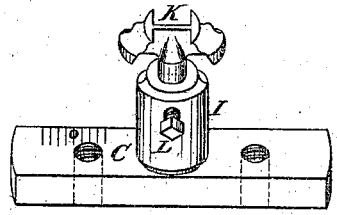
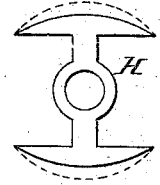

UNITED STATES PATENT OFFICE.

MYRON T. BOULT, OF BATTLE CREEK, MICHIGAN.

IMPROVEMENT IN APPARATUS FOR TURNING OVALS.

Specification forming part of Letters Patent No. 135,515, dated February 4, 1873.

*To all whom it may concern:*

Be it known that I, MYRON T. BOULT, of Battle Creek, in the county of Calhoun and State of Michigan, have invented a new and useful Improvement for the purpose of Turning Ovals, Eccentrics, and "Freeing" Cutters, of which the following is a specification:

Nature and Objects of my Invention.

My invention is of the nature of a chuck or head constructed of two principal parts attached to a mandrel, so arranged that one part can be made to revolve in an eccentric arc.

The object of my invention is an apparatus to be used on the machinists' common lathe to hold a piece of metal or other material for the purpose of turning it oval or eccentric, or partially so, for the purpose of reducing or flattening portions of the surface of a true circle by causing the chuck to revolve when deviated from a true center of motion.

Description of Drawing.

Figure 1 is a view of apparatus. Fig. 2 is a view of slide and chuck. Fig. 3 is a view of a cutter when "freed."

General Description.

A is a mandrel, held in a lathe by a center at one end and a steady-rest at the other. B is a head attached to said mandrel having a channel planed laterally along its face into which pieces C and C are to fit and which are held in position by set-screws D D, which enter through the slotted holes in head B. Slides or pieces C C are provided with stud E or chuck I, on and in which the work is held. The stud E is provided with rings F F F and nut G to secure the work firmly in position. Chuck I has a set-screw, L, for the purpose also of securing the work in position. The stud E or chuck I, when used respectively, may be adjusted to set and revolve in line with the center of the mandrel, by which the work may be made round, or they may be set one side of the center any number of degrees desired—indicated on the head B by the scale $m$—so that as much as necessary may be taken off from the circle between two given points, to give the amount of flatness or oval shape required. The slide C, with stud E or chuck I, can then be moved to bring the stud E or chuck I on the opposite side of the center an equal number of degrees, as before, by which the opposite side may be flattened like the first.

This apparatus is especially useful in freeing cutters, as is shown in H, Fig. 3, which shows a cutter when freed, the dotted lines showing the true circle as it comes from the lathe, (or when this apparatus is used with stud in line with the center of mandrel,) and the inside line shows the shape of the cutter after being freed by this process. As much may be taken off between the cutting-edges as is desired by setting the stud over more or less, causing it to revolve in more or less of an eccentric arc. A scale is provided on the head and slides for the purpose of placing the slides accurately in position when they are made fast by the set-screws D D.

This apparatus may be used in the machinists' common lathe, provided with a steady-rest, and the work is done by the ordinary lathe-tools.

What I claim as my invention, and ask to have secured by Letters Patent, is—

The adjustable slide C, with stud E or chuck I, (one or both,) in combination with head B, as arranged, and for the purposes set forth and described in accompanying specification and drawing.

MYRON T. BOULT.

Witnesses:
FRANK W. CLAPP,
C. E. LYMAN.